United States Patent
Quinlan et al.

(10) Patent No.: US 6,209,487 B1
(45) Date of Patent: Apr. 3, 2001

(54) PET FEEDING SYSTEM

(75) Inventors: Robert L. Quinlan, Stow; Patrick W. Brown, Strongsville; John R. Nottingham, Hunting Valley; John W. Spirk, Gates Mills, all of OH (US)

(73) Assignee: Pet Zone Products, Cleveland, OH (US)

( * ) Notice: Subject to any disclaimer, the term of this patent is extended or adjusted under 35 U.S.C. 154(b) by 0 days.

(21) Appl. No.: 09/339,742

(22) Filed: Jun. 24, 1999

Related U.S. Application Data

(60) Provisional application No. 60/090,564, filed on Jun. 24, 1998.

(51) Int. Cl.⁷ ........................................................ A01K 5/00
(52) U.S. Cl. ............................................ 119/51.01; 119/61
(58) Field of Search .................................. 119/51.01, 61; D30/121, 132, 129, 128, 130; 220/23.6, 23.87; 206/503, 505, 506, 509, 510, 511, 514, 515; D7/500, 509, 510

(56) References Cited

U.S. PATENT DOCUMENTS

| | | | |
|---|---|---|---|
| D. 194,784 | 3/1963 | Noble Van Vorhis . | |
| D. 227,139 | * 6/1973 | Niven . | |
| D. 245,104 | * 7/1977 | Gross | D25/36 |
| D. 358,738 | * 5/1995 | Brown et al. | D7/544 |
| D. 370,147 | * 5/1996 | Petronio | D6/534 |
| D. 373,449 | 9/1996 | Chen . | |
| D. 377,244 | 1/1997 | Steininger . | |
| D. 385,068 | 10/1997 | Malcolm . | |
| D. 393,107 | 3/1998 | Tsengas . | |
| D. 401,475 | * 11/1998 | Ritchey | D7/543 |
| D. 410,780 | * 6/1999 | McGinty | D30/124 |
| 2,213,837 | * 9/1940 | Gill . | |
| 3,455,280 | * 7/1969 | Keene | 119/61 |
| 3,653,362 | * 4/1972 | Davis | 119/61 |
| 3,698,594 | * 10/1972 | Boehlert | 220/63 |
| 3,991,719 | * 11/1976 | Bruce | 119/61 |
| 4,436,056 | * 3/1984 | MacLeod | 119/72 |
| 4,699,089 | 10/1987 | Teschke . | |
| 4,800,845 | * 1/1989 | Budd | 119/61 |
| 4,832,200 | * 5/1989 | Deaton et al. | 206/508 |
| 4,953,506 | * 9/1990 | Sanders | 119/61 |
| 5,193,487 | 3/1993 | Vogel . | |
| 5,205,242 | 4/1993 | Kesselman . | |
| 5,277,149 | * 1/1994 | East | 119/51.5 |
| 5,509,376 | 4/1996 | Tsengas . | |
| 5,564,345 | 10/1996 | Crawford et al. . | |

(List continued on next page.)

OTHER PUBLICATIONS

Copy of Brochure entitled "Healthy Pet Diner" marketed by OurPet's Company of Fairport Harbor, Ohio 44077, date unknown.

See Second Supplemental Information Disclosure Statement regarding discussion of Reference AR.

Primary Examiner—Peter M. Poon
Assistant Examiner—Yvonne Abbott
(74) Attorney, Agent, or Firm—Robert H. Earp, III; Raymond A. Miller

(57) ABSTRACT

An improved elevated animal feeder apparatus that provides food at an elevated position to provide a more comfortable and healthy feeding position for animals. The animal feeder apparatus includes a support structure having removable feeder vessels. The support structure is of a unitary molded plastic construction and is configured for nested stacking with like feeder assemblies for convenient and compact storage and handling. The base of the top surface of the support structure is generally oblong in shape with flared side surfaces to provide support. The top surface has openings for receiving feeding vessels. A preferred feeding vessel has a raised back surface to act as a back splash. The raised back splash may also include a notch for easily removing the feeding vessel form the support structure for filling and cleaning the vessel.

21 Claims, 5 Drawing Sheets

U.S. PATENT DOCUMENTS

| | | | |
|---|---|---|---|
| 5,619,952 | * | 4/1997 | Walker .................................. 119/61 |
| 5,626,256 | * | 5/1997 | Onneweer ........................... 220/574 |
| 5,709,168 | * | 1/1998 | Walker .................................. 119/61 |
| 5,730,081 | | 3/1998 | Tsengas . |
| 5,743,210 | | 4/1998 | Lampe . |
| 5,782,374 | * | 7/1998 | Walker ................................ 220/404 |
| 5,794,564 | * | 8/1998 | Paro ..................................... 119/61 |
| 5,881,670 | * | 3/1999 | Pelsor ................................... 119/61 |

* cited by examiner

PET FEEDING SYSTEM

CROSS-REFERENCE TO RELATED APPLICATIONS

This application is related to provisional patent application Ser. No. 60/090,564 filed on Jun. 24, 1998.

FIELD OF THE INVENTION

An improved animal feeder apparatus comprising a support structure and removable feeder vessels. The support structure is of a unitary molded plastic construction and is configured for nested stacking with like feeder assemblies for convenient and compact storage and handling. The base of the top surface is preferably oblong in shape with flared side surfaces to provide support. The top surface has means for receiving feeding vessels. A preferred feeding vessel of the invention has a back splash and means for conveniently removing the vessel from the support structure.

BACKGROUND OF THE INVENTION

It has been found that the health of a dog or other such pet, can be improved by providing a feeding position which is raised above the ground or floor. This reduces or eliminates the need for the dog to position its' head downward during feeding. Among the benefits of an elevated feeding position are that the dog swallows less air during feeding. Moreover, dogs suffering from arthritis can feed with reduced pain. Overall, an elevated feeding position provides a more comfortable and convenient feeding position.

While there are structures known in the prior art which provide an elevated position for a feeding vessel, these structures have many significant disadvantages. The disadvantages include feeding vessels which are fixed to the support structure, or feeding vessels which have curved bottom surfaces. These types of feeding vessels are inconvenient to fill with foodstuff, such as dog food or water. Moreover, such feeding vessels cannot be placed on the ground or floor for use separate from the support structure.

Feeder apparatuses of the prior art have included many different designs. For small animals, a feeder apparatus may include non-removable feeder vessels which are typically molded into a one-piece feeder apparatus of approximately 2–3 inches in height. Obviously, a feeder apparatus of this size does not require legs for support.

For larger animals, those requiring a feeder apparatus having a height of six inches or greater, feeder apparatuses of the art tend to be large structures with legs for support or of a multi-piece box design. A feeding apparatus with legs tend to have support problems. Thus, in U.S. Pat. No. 5,509,376 it is taught a feeding apparatus for larger animals wherein the legs are hollow to allow ballast to provide support. The legs may be detachable in which case the unit is of multiple parts. In some structures, the unit may have foldable legs to provide a reduced "footprint" of the feeder assembly for shipping or display. Such detachable or folding legs tend to become unstable during prolonged use.

None of the above elevated feeder assemblies have a one-piece support base nor allow for the "nesting" of the feeder assemblies. Nesting is an exceptionally important concept that allows the feeder apparatus to reduce the amount of retail shelf space needed for display, and also allows the consumer to see the entire unit. The present invention combines the concept of a one-piece molded construction support structure with increased stability with the concept of nesting to provide a low-cost, highly stable elevated feeding apparatus with compact storage and handling capabilities.

SUMMARY OF THE INVENTION

According to the present invention there is provided an elevated animal feeder apparatus including a support structure and a detachable feeding vessel, wherein said support structure supports the feeding vessel at a position elevated above the ground or floor. The invention may be summarized as, an elevated feeder apparatus for nested stacking with like feeder apparatuses, said feeder apparatus comprising (a) a feeding vessel; and (b) a support structure having a top wall, said top wall having at least one opening for receiving said feeding vessel, and having flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship.

For purposes of this invention, an elevated feeding apparatus means an apparatus that places the feeding vessel at least six inches from the ground that the apparatus rests on. Preferred is a feeding apparatus wherein the feeding vessel is raised at least eight inches, and most preferably at least ten inches from the ground.

An advantage of the present invention is the provision of a pet feeding system wherein the feeding vessel is detachable from the support structure.

Another advantage of the present invention is the provision of a pet feeding system wherein the detached support structure may be placed upon a generally flat surface and used for feeding a relatively small dog (e.g., a puppy) on the ground or floor.

Another advantage of the present invention is the provision of a pet feeding system wherein the feeding vessel can be easily and conveniently grasped for removal from the support structure.

Still another advantage of the present invention is the provision of a pet feeding system wherein the feeding vessel has a raised back wall to prevent foodstuffs, such as dog food and water, from "splashing" out of the feeding vessel.

Still another advantage of the present invention is the provision of a pet feeding system, wherein the support structure does not interfere with the dogs ability to position itself close to the feeding system.

Still another advantage of the present invention is the provision of a pet feeding system which eliminates the need for ballast material to provide stability.

Yet another advantage of the present invention is the provision of a pet feeding system wherein the support structure can be "nested" for convenient storage.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
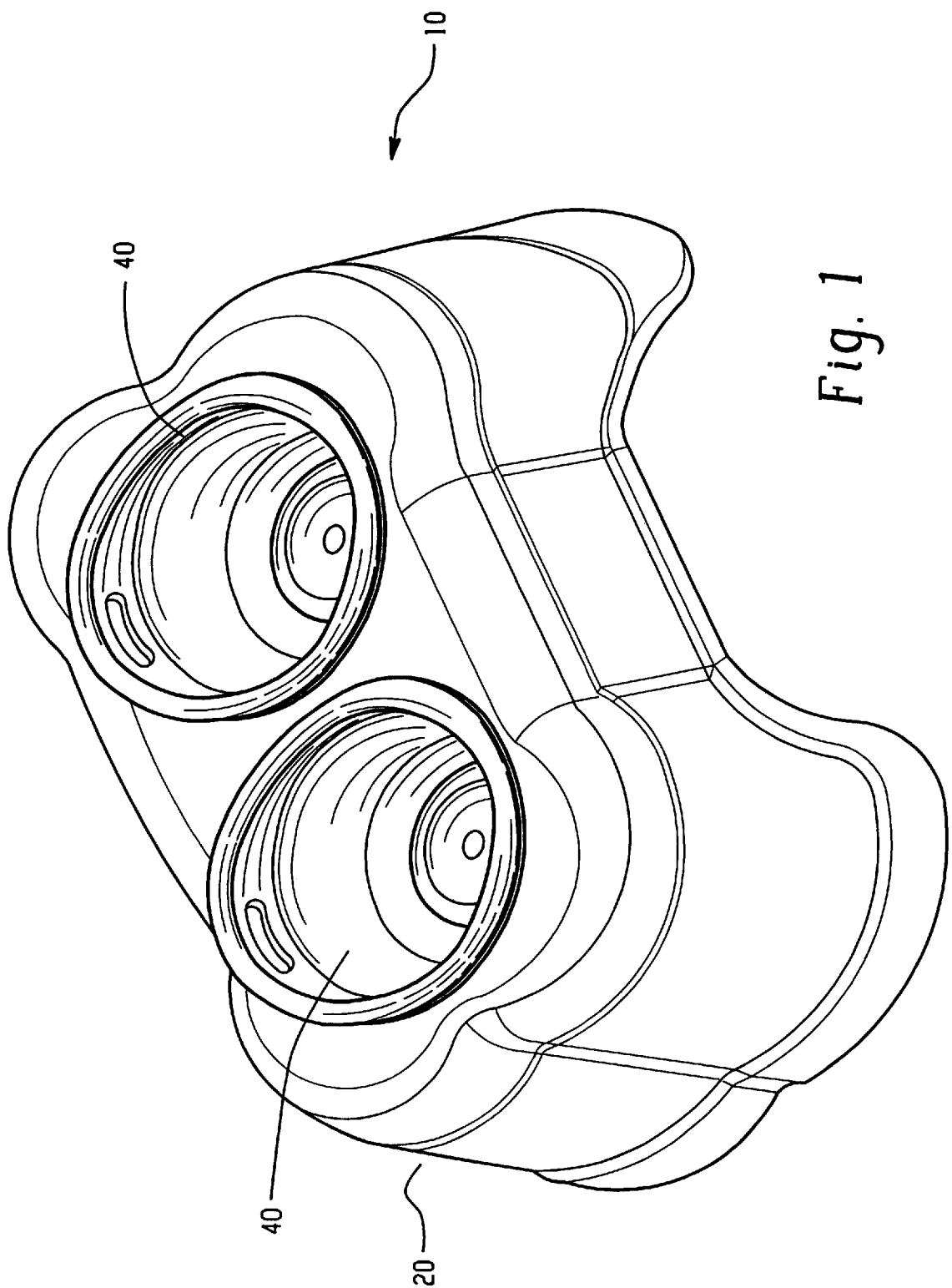
FIG. 1 is a front perspective view of the pet feeding system according to a preferred embodiment of the present invention.

Referring now to the drawings, FIGS. 1–8 illustrate an elevated animal feeder apparatus for the purposes of illustrating a preferred embodiment of the invention only, and not for purposes of limiting the same.

FIG. 1 illustrates pet feeder apparatus 10 generally comprised of a support structure 20 and one or more feeding vessels 40. As better illustrated in FIG. 2, a preferred embodiment of the present invention support structure 20 includes a top wall 22 and downward extending flared side walls 26. A pair of recesses 24 are formed in top wall 22 for acceptance of feeding vessels 40, which are described in detail below. Flared side walls 26 extend downward from top wall 22, around the perimeter thereof. Top wall 22 may also contain a boundary ridge 30 as better shown in FIG. 4. Top wall 22 may additionally include projections 32 to engage the back splash 46 of the feeding vessel described in FIG. 6.

Figure 3:
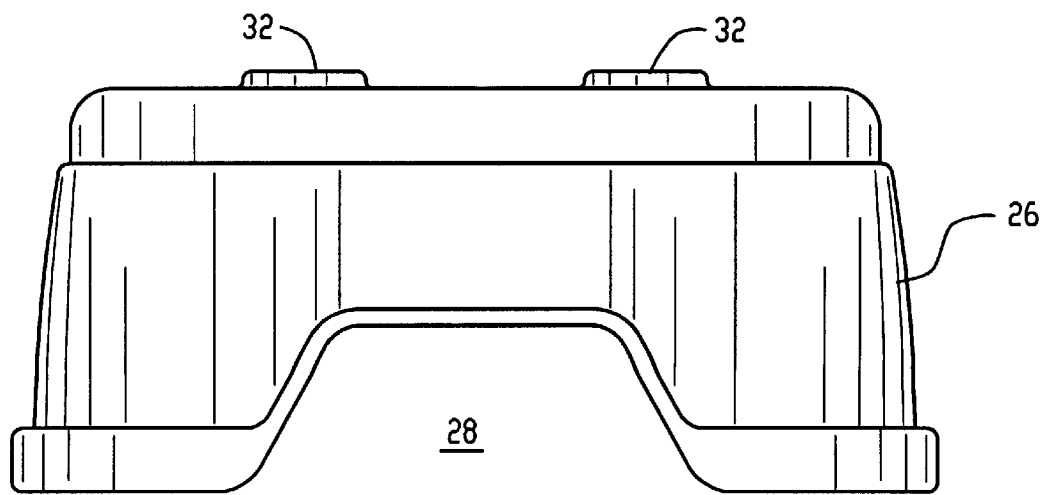
FIG. 3 is a side elevation view of the pet feeding apparatus support structure.

As shown in FIG. 3, flared side walls 26 may also include an opening 28 formed in side walls 26 to accommodate a pet's paws or knees and thus provide the animal with sufficient clearance to position itself close to the feeding apparatus.

Figure 2:
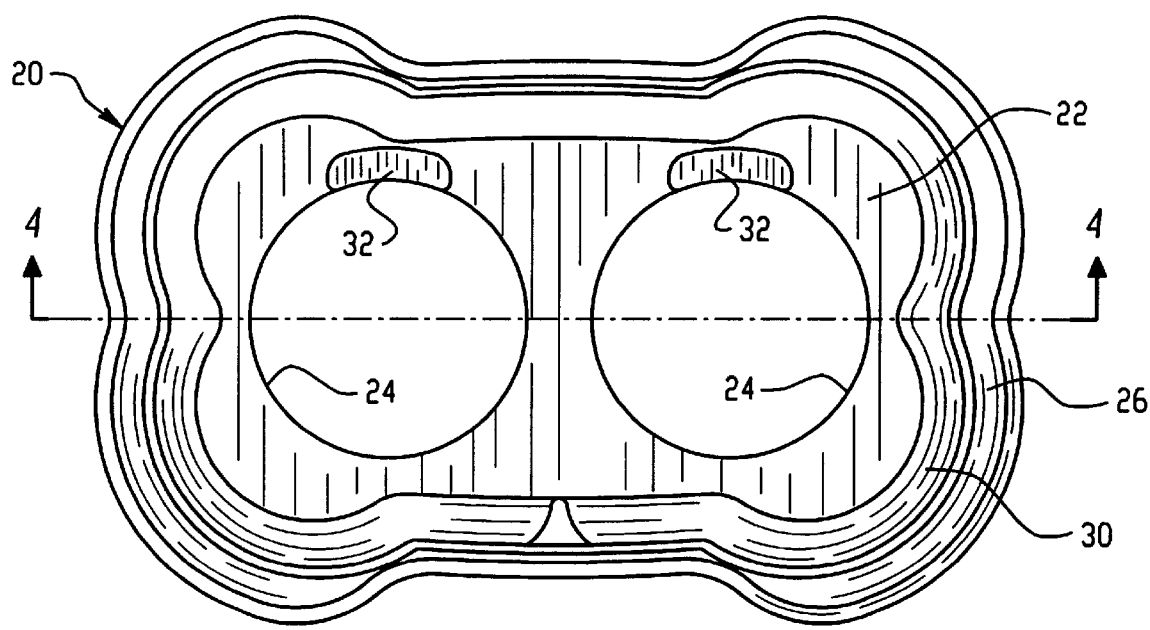
FIG. 2 is a top plain view of the pet feeding assembly support structure.
Figure 4:
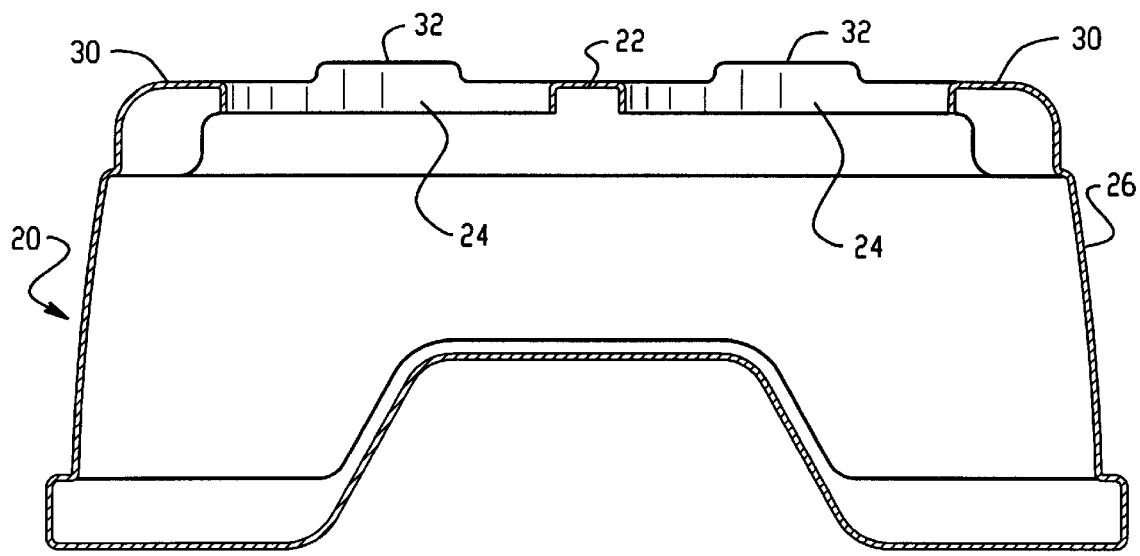
FIG. 4 is a sectional view along line 4 of FIG. 2.
Figure 5:
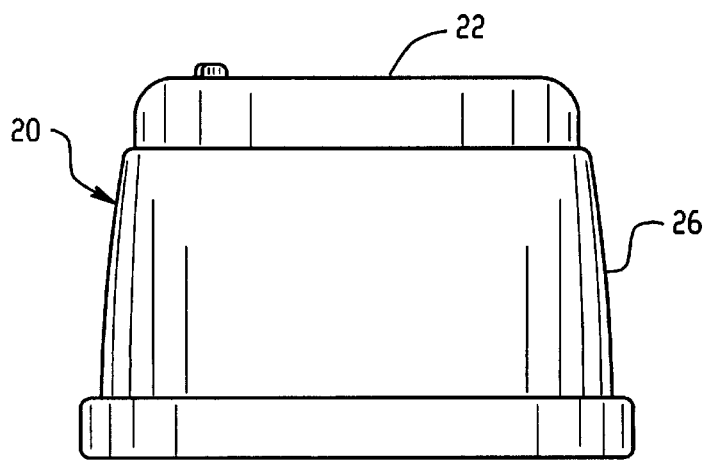
FIG. 5 is an end elevation view of the pet feeding apparatus support structure.

The elements of top wall 22 are better shown in FIG. 4, being a cut-away section of FIG. 2. In the preferred embodiment, top wall 22 has boundary ridge 30 to prevent spills from the feeding vessels. Openings 24 are dimensioned suitable for acceptance of feeding vessels 40. Optional ridges 32 allow for acceptance of notch 44 of the feeder vessel 40. Flared side walls 26 extend downward from top wall 22 around the perimeter to provide stability to the overall feeding apparatus as shown in FIG. 5.

Figure 6:
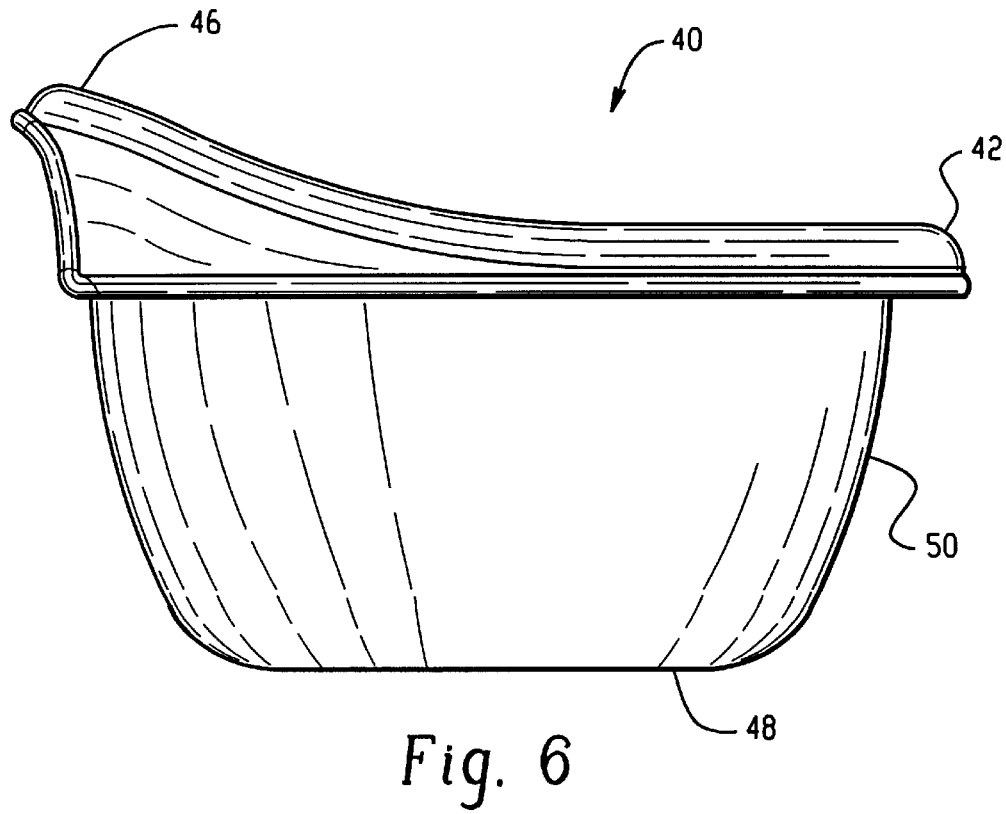
FIG. 6 is an elevated view of a detachable feeding vessel of the pet feeding apparatus.
Figure 7:
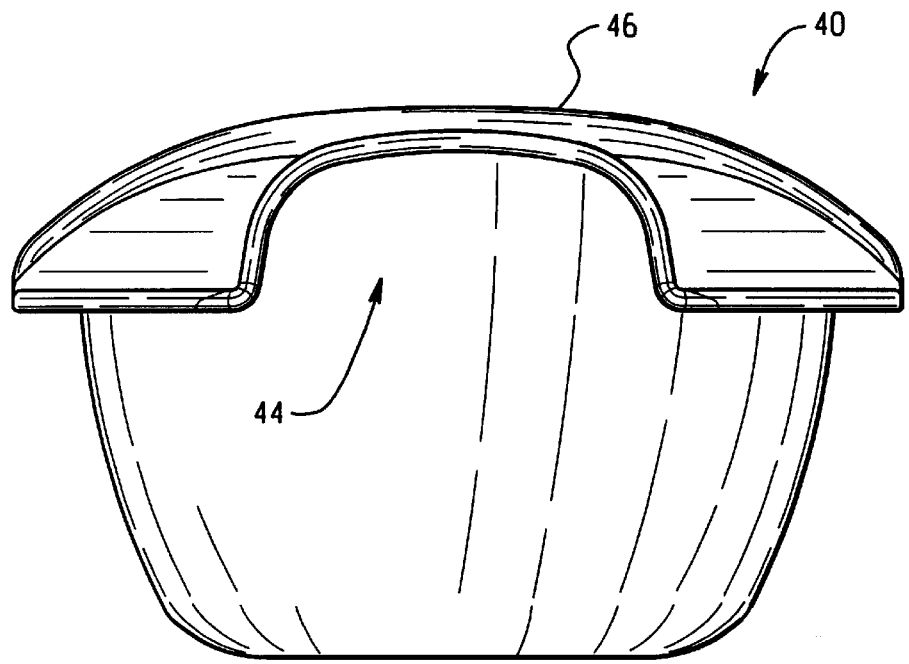
FIG. 7 is a back view of the feeding vessel of FIG. 6.

Although any feeding vessel may be utilized in the present invention, a preferred embodiment of the feeding vessel is shown in FIGS. 6–7. Feeding vessel 40 may take the general form of a dog bowl. Feeding vessel 40 is generally comprised of a generally planar base 48 and a circular wall 50. A lip 42 is formed along the upper edge of circular wall 50. The rear end of circular wall 50 has a raised portion 46, which acts as a "splash guard" to prevent the back splash of foodstuff, as the animal is feeding. The raised portion may extend from about 10 to 75 percent of the perimeter of the lip. Preferred is a back splash of about 10 to 50 percent coverage, however 10 to 30 percent will still provide the necessary back splash function. As a result, the area surrounding the feeding apparatus remains free of foodstuff, and less foodstuff is wasted. A notch 44 is formed in the rear of lip 42 and guard 46. Notch 44 forms a handle, which allows a user to easily and conveniently grasp feeding vessel 40 during detachment of feeding vessel 40 from support structure 20. It will be appreciated that feeding vessel 40 may be removed from support structure 20 for filling with foodstuff. Moreover, since feeding vessel 40 has a generally planar base in its preferred mode, it is suitable for direct placement on a generally flat surface, such as the ground or floor. Notch 44 may also engage projection 32 (as shown in FIG. 1). When feeding vessel 40 is placed in the support structure, the projection and notch arrangement ensures that the back splash is in the proper position relative to the overall feeding apparatus.

It should be appreciated that the lower surface of base 48 may be accessible from underneath support structure 20. In this regard, the user may push upward on feeding vessel 40 to facilitate its removal from support structure 20.

Figure 8:
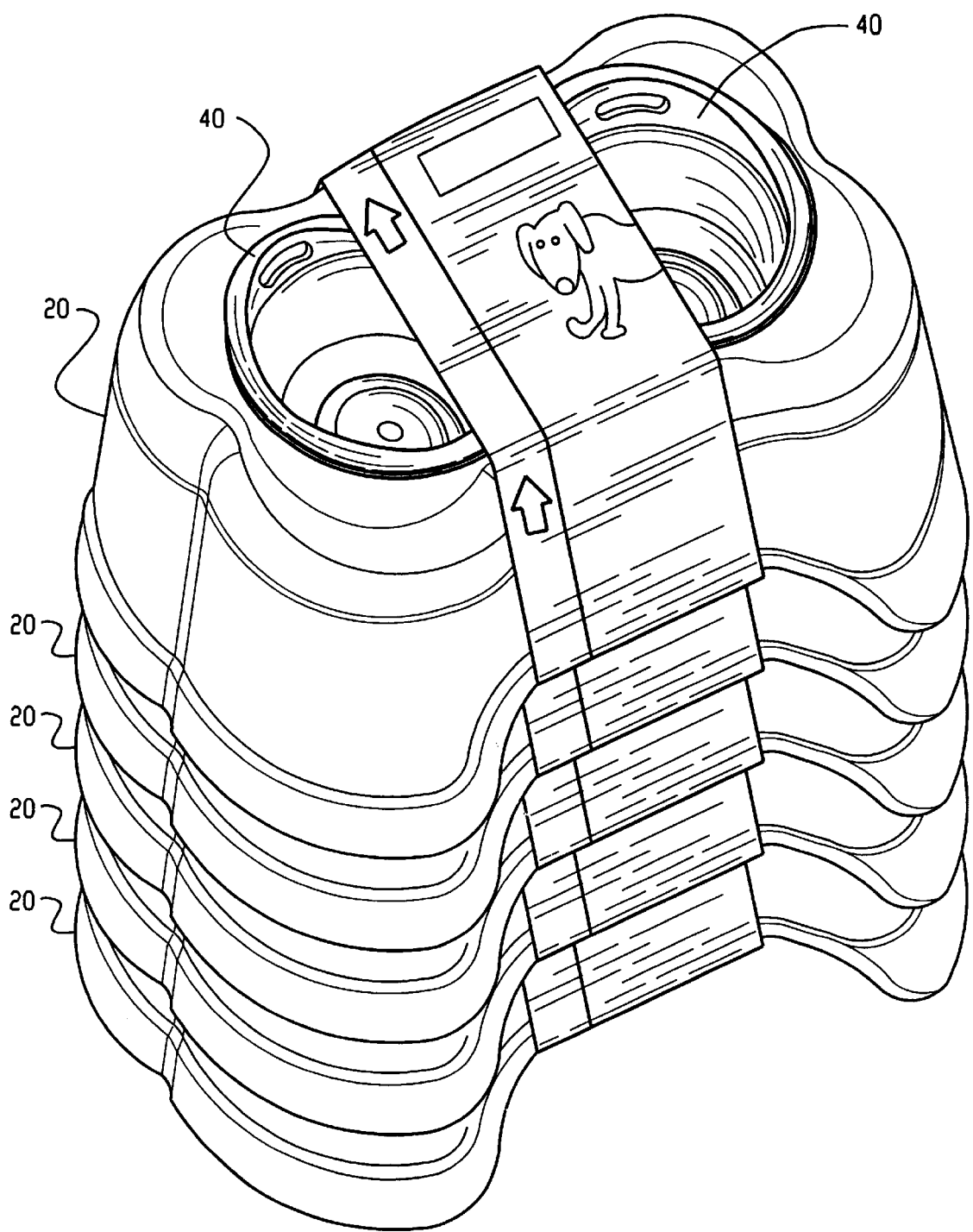
FIG. 8 shows the plurality of "nested" pet feeding apparatuses

FIG. 8 shows the nesting concept of the pet feeder apparatus. The feeder apparatus, consisting of support structure 20 and feeder vessels 40 sit on top of each other such that multiple feeding apparatuses may be displayed in minimum space.

To improve the nesting ability of the apparatus, ribs may be provided on the underside of the top wall 22 that will then rest on the top surface of the lower feeder apparatus in the nest. This has the advantage of providing a gap such that the apparatus does not stick to each other when nested.

In a preferred embodiment, the support structure 20 and the feeding vessel 40 may be made of a plastic material. Any plastic material that will provide some degree of rigidness is suitable for the support structure. Such plastics have included high density polyethylene and polypropylene. Preferred is polypropylene. Additives may be added to the polypropylene to increase the rigidness of the plastic, which is known in the art as filled polypropylene. The wall thickness may be any desired thickness that when combined with the type of plastic, gives sufficient rigidness. Preferred in the present invention is a thickness of approximately ⅛ inch. The plastic material is formed through a blow molding or preferably injection molding process to produce the individual pieces.

The invention has been described with reference to a preferred embodiment. Obviously, modifications and alterations will occur to others upon a reading and understanding of this specification. While the present invention has been illustrated with two feeding vessels, it should be appreciated that the feeding apparatus of the present invention may be suitably configured with one or more feeding vessels. Moreover, while the support structure of the present invention has been illustrated as having the general shape of a dog bone, the support structure can take other suitable forms including generally oblong. In addition, it should be appreciated that the present invention may be adapted for use by animals other than dogs. In this respect, the height and size of the pet feeding apparatus may be adapted for both smaller and larger animals. It is intended that all such modifications and alterations be included insofar as they come within the scope of the appended claims or the equivalent thereof.

We claim:

1. An elevated feeder apparatus for nested stacking with like feeder apparatuses, said feeder apparatus comprising:

(a) a feeding vessel; and (b) a support structure having a top wall, said top wall having at least one opening for receiving said feeding vessel, and having flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship; and at least one side wall having a recessed edge portion spaced from the co-planar lower edge surface to accommodate an animal's paws so that the animal can position itself close to said apparatus during feeding.

2. The elevated animal feeder apparatus of claim 1, wherein the distance from the top wall to the co-planar lower edge surface of the side wall is equal or greater than six inches.

3. The elevated animal feeder apparatus of claim 1, wherein the support structure is of a unitary molded plastic construction.

4. The elevated animal feeder of claim 1, wherein said top wall has a raised ridge extending along the perimeter of said top surface to prevent spills from said feeding vessels.

5. The elevated animal feeder apparatus of claim 1, wherein said top wall has a top surface of generally oblong shape.

6. An elevated feeder apparatus for nested stacking with like feeder apparatuses, said feeder apparatus comprising:
   (a) a feeding vessel; and
   (b) a support structure having a top wall, said top wall having at least one opening for receiving said feeding vessel, and having flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship; wherein said top wall has a bottom surface, said bottom surface having ribs contiguous with the bottom surface.

7. The elevated animal feeder apparatus of claim 6, wherein said ribs have bottom surfaces for engaging a subjacent animal feeder apparatus of like construction for spacing said top wall of said animal feeder apparatus above the top wall of the subjacent feeder apparatus.

8. An elevated feeder apparatus for nested stacking with like feeder apparatuses, said feeder apparatus comprising:
   (a) a feeding vessel comprising:
      a. a vessel having a circular wall having an upper edge, said circular wall forming a concave surface facing the interior of the vessel; and
      b. a lip formed along the upper edge of said circular wall, said lip extending around the perimeter of said circular wall, said lip having a raised portion between 10 and 70 percent of the perimeter of said circular wall, said raised portion acting as a splash guard to said vessel; and
   (b) a support structure having a top wall, said top wall having at least one opening for receiving said feeding vessel, and having flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship.

9. The elevated feeder apparatus of claim 8, wherein said lip has a raised portion between 10 and 50 percent of the perimeter of said circular wall.

10. The elevated feeder apparatus of claim 8, wherein said vessel additionally has a co-planar bottom wall.

11. The elevated feeder apparatus of claim 8, wherein said raised portion of said lip has an inner surface and an outer surface, said outer surface having a notch suitable for lifting said feeding vessel.

12. An animal feeding vessel, wherein said feeding vessel comprises:
   (a) a vessel having a circular wall having an upper edge, said circular wall forming a concave surface facing the interior of the vessel; and
   (b) an outwardly extending lip formed along the upper edge of said circular wall, said lip extending around the perimeter of said circular wall, said lip having a raised portion between 10 and 70 percent of the perimeter of said circular wall, said raised portion acting as a splash guard to said vessel.

13. An elevated feeder apparatus for nested stacking with like feeder apparatuses, said feeder apparatus comprising:
   at least one feeding vessel;
   a support structure having a top wall and downwardly extending, outwardly-flared side walls, said top wall configured to support said at least one feeding vessel, and said outwardly-flared side walls being configured and spaced apart sufficiently to clear the top wall of a subjacent feeder apparatus of identical construction to allow multiple feeder apparatuses to be stacked in nested relationship; and at least one side wall having an opening to accommodate an animal's paws so that the animal can position itself close to said apparatus during feeding.

14. The feeder apparatus of claim 13 wherein said top wall includes at least one opening for receiving said feeding vessel.

15. The feeder apparatus of claim 14 wherein said feeding vessel comprises:
   a container having a bottom wall and upwardly extending side walls, said container dimensioned to be inserted into said opening;
   a lip extending outwardly from the upper edge of said side walls capable of engaging said support structure and supporting said container within said opening.

16. The feeder apparatus of claim 15 wherein said lip includes a downwardly extending portion which engages said top wall of said support structure and supports said container within said opening.

17. The feeder apparatus of claim 15 wherein said bottom wall of said container is planar and capable of resting on a flat surface.

18. An elevated feeder apparatus for nested stacking with like feeder apparatuses, said feeder apparatus comprising:
   a support structure having a top wall and downwardly extending, outwardly-flared side walls, said top wall including at least one opening for receiving a feeding vessel, and said outwardly-flared side walls being configured and spaced apart sufficiently to clear the top wall of a subjacent feeder apparatus of identical construction to allow multiple feeder apparatuses to be stacked in nested relationship;
   at least one feeding vessel comprising:
      a container having a bottom wall and upwardly extending side walls, said container dimensioned to be inserted into said opening;
      a lip extending outwardly from the upper edge of said side walls capable of engaging said support structure and supporting said container within said opening, said lip including a downwardly extending portion which engages said top wall of said support structure and supports said container within said opening, said downwardly extending portion of said lip including a notch suitable for accessing the interior surface of said outwardly extending lip and grasping said lip and lifting said container out of said opening, said downwardly extending portion of said lip includes a notch suitable for accessing the interior surface of said outwardly extending lip and grasping said lip and lifting said container out of said opening.

19. The feeder apparatus of claim 18 further comprising:

at least one projection extending upwardly from said top wall which engages said notch to properly orient said feeding vessel with respect to said support structure.

20. The feeder apparatus of claim 19 wherein said notch extends above the surface of said projection to allow access to the interior surface of said outwardly extending lip during engagement between said notch and said projection suitable for grasping said lip and lifting said container out of said opening.

21. An elevated feeder apparatus for nested stacking with like feeder apparatuses, said feeder apparatus comprising:

at least one feeding vessel;

a support structure having a top wall and downwardly extending, outwardly-flared side walls, said top wall configured to support said at least one feeding vessel, and said outwardly-flared side walls being configured and spaced apart sufficiently to clear the top wall of a subjacent feeder apparatus of identical construction to allow multiple feeder apparatuses to be stacked in nested relationship; and ribs contiguous with the bottom surface of said top wall, wherein said ribs have bottom surfaces for engaging a subjacent feeder apparatus of like construction for spacing said top wall of said feeder apparatus above the top wall of the subjacent feeder apparatus.

* * * * *